US008587622B2

(12) United States Patent
Cardoso et al.

(10) Patent No.: US 8,587,622 B2
(45) Date of Patent: Nov. 19, 2013

(54) GENERATION OF DIGITAL ELECTROSTATIC LATENT IMAGES AND DATA COMMUNICATIONS SYSTEM USING ROTARY CONTACTS

(75) Inventors: George Cunha Cardoso, Webster, NY (US); Mandakini Kanungo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 184 days.

(21) Appl. No.: 13/035,736

(22) Filed: Feb. 25, 2011

(65) Prior Publication Data

US 2012/0218364 A1 Aug. 30, 2012

(51) Int. Cl.
*B41J 2/385* (2006.01)
*G01D 15/06* (2006.01)
*B41J 2/39* (2006.01)
*B41J 2/395* (2006.01)

(52) U.S. Cl.
USPC .......................................... 347/111; 347/141

(58) Field of Classification Search
USPC .......................................................... 347/111
See application file for complete search history.

(56) References Cited

U.S. PATENT DOCUMENTS 3,121,006 A 2/1964 Middleton et al.
3,979,757 A * 9/1976 Kilby et al. .................. 347/146
4,005,436 A * 1/1977 Kleinknecht et al. ......... 347/148
4,448,867 A * 5/1984 Ohkubo et al. ................. 430/31
4,464,450 A 8/1984 Teuscher
4,620,203 A * 10/1986 Nakatani et al. .............. 347/112
4,757,343 A * 7/1988 Nakatani et al. .............. 347/142
4,921,773 A 5/1990 Melnyk et al.
5,640,189 A * 6/1997 Ohno et al. .................. 347/141
6,100,909 A 8/2000 Haas et al.
7,114,864 B2 * 10/2006 Shimoda et al. ................ 400/76
7,381,000 B2 * 6/2008 Shimoda et al. ................ 400/76
7,388,594 B2 * 6/2008 Kim et al. ..................... 347/141
8,036,563 B2 * 10/2011 Kim ................................ 399/90
8,233,017 B2 * 7/2012 Law et al. ..................... 347/141
2002/0141801 A1 * 10/2002 Shimoda et al. ................ 400/76
2004/0206956 A1 * 10/2004 Yanai et al. ..................... 257/59

FOREIGN PATENT DOCUMENTS

WO WO 9113748 A1 * 9/1991 ............. B30B 15/34

OTHER PUBLICATIONS

Mercotac Service Instructions, downloaded from http://www.mercotac.com/html/literature.html, Oct. 4, 2012.*
Mercotac Service Instruction Properties, downloaded from http://www.mercotac.com/html/literature.html, Oct. 4, 2012.*

(Continued)

*Primary Examiner* — Laura Martin
*Assistant Examiner* — Jeremy Bishop
(74) *Attorney, Agent, or Firm* — Pillsbury Winthrop Shaw Pittman LLP

(57) ABSTRACT

An apparatus for printing a latent image includes a rotary contact, a power supply, driving electronics and a plurality of TFT transistors configured as a TFT backplane. The rotary contact receives serially transmitted digital data signals from a controller and generates selection signals and digital pixel voltages. The rotary contact receives operating voltage signals from the controller. The power supply receives the operating voltage signals from the rotary contact and generates a low voltage signal, a ground signal and a high voltage signal. The driving electronics receive the low voltage signal, the ground signal, selection signals and the digital pixel voltages, and generates bias signals and pixel voltages. The TFT backplane receives the high voltage signal, the bias signals and the pixel voltages, and then drives the hole injection pixels to generate an electrostatic latent image in response to the bias signals and pixel voltages.

24 Claims, 6 Drawing Sheets

(56) References Cited

OTHER PUBLICATIONS

Mercotac Catalog, downloaded from http://www.mercotac.com/html/literature.html, Oct. 4, 2012.*

Mercotac Catalog Properties, downloaded from http://www.mercotac.com/html/literature.html, Oct. 4, 2012, showing date of creation Feb. 1, 2005.*

Mark Lefebvre, Zhigang Qi, Danesh Rana and Peter G. Pickup: Chemical Synthesis, Characterization and Electrochemical Studies of Poly(3,4-ethylenedioxythiophene)/Poly(styrene-4-sulfonate) Composites Oct. 28, 1998, pp. 262-268, St. John's, Newfoundland, Canada.

Hsing C. Tuan: Novel a-Si:H Thin Film High Voltage Transistor, 1986, pp. 651-656, Palo Alto, CA.

Li Niu, Carita Kvarnstrom, K. Froberg and Ari Ivaska: Electrochemically Controlled Surface Morphology and Crystallinity in Poly(3/4-ethylenedioxythiophene) Films, Sep. 7, 2000, pp. 425-429, Abo-Turku, Finland.

Alexandre Mantovani Nardes: on the Conductivity of PEDOT:PSS Thin Films, Dec. 18, 2007, pp. 1-158 (includes index pgs.), geboren to São Paulo, Brazilië.

K.S. Karim, P. Servati and A. Nathan: High Voltage Amorphous Silicon TFT for Use in Large Area Applications, 2004, pp. 311-315.

* cited by examiner

GENERATION OF DIGITAL ELECTROSTATIC LATENT IMAGES AND DATA COMMUNICATIONS SYSTEM USING ROTARY CONTACTS

CROSS REFERENCE TO RELATED APPLICATIONS

Reference is made to commonly owned U.S. Pat. No. 8,233,017 to Law et al., entitled Digital Electrostatic Latent Image Generating Member, U.S. Pat. No. 8,173,340 to Kanungo et al. Digital Electrostatic Latent Image Generator, and Generation of Digital Electrostatic Latent Images Utilizing Wireless Communication Systems to Law et al., U.S. patent application Ser. No. 13/008,802, the entire disclosures of which are incorporated herein by reference in its entirety.

BACKGROUND

The presently disclosed embodiments relates to a data communication system to be utilized in a direct digital marking (printing) system, namely utilizing a rotary electrical contact to serially transfer power and millions of bits of data between a controller and a novel imaging member.

There are two conventional color printing technology platforms, i.e., inkjet and xerography, and other new color printing technology platform, i.e., digital flexo or digital offset printing. Each of these color printing technology platforms have highly complex print systems, which leads to complicated print processes, high box (device) cost, and high print run cost.

New advances in nanotechnology and display technology have led to the development/discovery that a digital electric field can be created utilizing an electric field induced hole injection reaction between a patternable hole injection nanomaterial and the Xerox charge (hole) transport layer. For example, in U.S. Pat. Nos. 8,233,017 and 8,173,340 , entitled Digital Electrostatic Latent Image Generator, and Digital Electrostatic Latent Image Generator, respectively, Carbon Nanotube (CNT) and PEDOT were found to inject holes efficiently to the Xerox charge transport layer (CTL, TPD in polycarbonate) under the influence of an electric field. CNT and PEDOT are patternable using nanofabrication techniques and thus pixels can be made in the micron dimension. When these pixels are overcoated with the TPD CTL, digital latent images may be created and these pixels may be integrated into the appropriate backplane technology to fully digitize the printing system.

In addition, in a xerographic development system, latent image generation and toner development can also occur without using the conventional combination of the ROS/ Laser and charger thus simplifying the generation of latent electrostatic images compared to xerography. This has been discussed in application Ser. No. 12/869,605, entitled "Direct Digital Marking Systems." Illustratively, a bilayer device comprising a PEDOT hole injection layer and the TPD CTL may be mounted an OPC drum in the CRU. The drum was rotated through the development nip and a toner image was observed in the post-development region. As the bilayer member first contacted the magnetic brush, the bias on the magnetic brush induced a hole injection reaction to create the electrostatic latent image on the CTL surface of the bilayer. This was followed by toner development before the bilayer member exited the development nip. This two step process was accomplished within the development nip, resulting in direct toned printing without laser/ROS, charger or PR. The permanent image may be obtained by transferring the toned image to paper following fusing.

This nano image marker and the direct digital printing process can also be extended to print with flexo ink, offset ink and liquid toner, as is discussed in application Ser. No. 12/854,526, entitled "Electrostatic Digital Offset Printing." Thus, the new direct printing concept may be regarded as a potential new digital printing platform.

U.S. Pat. No. 6,100,909 (to inventors Hass and Kubby) describes an apparatus for forming an imaging member. The apparatus includes an array of high voltage thin-film transistors (TFT) and capacitors. A latent image is formed by applying DC bias to each TFT using a High Voltage Power Supply and charged-area detection (CAD)-type development. FIG. 1 illustrates an array of thin film transistors in the apparatus for forming an imaging member. The array 10 is arranged in a rectangular matrix of 5 rows and 5 columns. Although only five rows and columns are illustrated, in embodiments of the invention located in devices that print or image on an 8.5 inch by 11-inch array having a 600 dots per inch (dpi) resolution, the array 10 would include $3\times10^5$ transistors which would correspond to $3\times10^5$ million pixel cells. In addition, for 1200 dpi resolution, the array would have $7\times10^5$ million transistors and $7\times10^5$ pixel cells.

The array 10 when coupled to a bilayer imaging member consisting of hole injection pixels overcoated with a hole transport layer generates latent images from digital information supplied by a computer 44 (e.g., print engine) to a controller 42. The computer supplies digital signals to a controller 42 (or a digital front end (DFE)), which decompose the digital signals into the utilized color space (e.g., either CMYK or RGB color space) with different intensities and the digital bits are created that correspond to the image to be printed. The controller 42 directs the operation of the array 10 through a plurality of interface devices including a decoder 12, a refresh circuit 18, and a digital-to-analog (D/A) converter 16

In contrast to other active matrix products (such as a television or monitor), which are static, the new nano imaging member (whether connected to or part of a belt or drum) is expected to be moving during the printing process. Millions of bits will need to be transmitted to the moving imaging member to create the digital electric filed. The moving imaging member is attached a rotating imaging drum. In addition, power needs to be supplied to the driving electronics and moving imaging member. Thus, a serious challenge arises to commutate the backplane with the driving electronic while the belts (or drum) are moving. While the belt or drum is moving, millions of bits and also electric current are being supplied to the backplane. The data needs to be transmitted and received in the high Megahertz range in order to meet customer needs.

In prior filed application entitled Generation of Digital Electrostatic Latent Images Utilizing Wireless Communications, Attorney Docket No. 20101021-390426, it was proposed to transmit the data wirelessly from the controller to the imaging drum. This implementation requires an extra level of hardware which is the wireless transmitter and receiver (i.e., the wireless link). This increases the costs of the printing device. In addition, depending on the wireless transmission protocol utilized, security may be an issue because the wireless transmission may not be secured or encrypted.

In addition, connecting the millions of transistors in the array, which is attached to a rotating drum, is difficult. Brushes and other types of contacts, which are normally utilized, are problematic due to the large number of brushes (or contacts) that are required. The noise created by the brushes or other contacts can cause errors in data transmission accuracy.

Accordingly, there is an unmet need for systems and/or methods that provide the large amount of data to the moving nano imaging member in a printing device in an accurate and cost-effective manner. The data needs to be transferred via a minimum number of contacts between the controller and the rotating drum (array).

SUMMARY

According to embodiments illustrated herein, there are systems and methods are described that utilize rotary connects to commutate data and power between the print engine/controller and the driving electronics/nano imaging member. More specifically, a rotary electrical contact is installed on a surface of a drum and connects the controller to the driving electronics. In embodiments of the invention, the rotary contact includes four contacts (two for transmission of digital serial data and two for the transmission of electrical energy (or power) to circuits inside the imaging drum). In embodiments of the invention, the rotary contact includes four contacts (one for transmission of digital serial data and three for the transmission of electrical energy (or power) to circuits inside the drum. In embodiments of the invention, additional rotary contacts may be added to increase the overall though throughput of the printer. The rotary contact is connected to a digital-to-analog converter which converts the received digital serial data and converts it into voltages for the thin-film transistor (TFT) backplane. In embodiments of the invention, a print file is sent to the controller (or the digital front end "DFE"), where the print file is decomposed into either CMYK or RBG digital bits. The controller sends CMYK or RBG digital bits to the drum via the rotary contact utilizing the data line (or lines). The digital CMYK or RBG are transmitted serially. The rotary electronic contact is installed on a rotating image drum. The driving electronics is located internal or inside the rotating image drum. The driving electronics receives the digital signals, converts the digital signals to analog signals and then transfers the analog signals to the TFTs in the TFT backplane of the moving nano imaging member. The signals and voltages received by the TFTs in the TFT backplane induce hole injection in the hole injection pixels of the bi-layer imaging member and create a digital electric field. The digital electric field creates a latent image and printing is performed utilizing a small number of contacts between the stationary part of the printer and the moving nano imaging member. Latent images are then printed (or developed) depending on the subsequent marking technology.

In further embodiments of the invention, the rotary contact includes three contacts (one for transmission of digital serial data and two for the transmission of electrical energy (or power) to circuits inside the drum. The two contacts are used with a symmetric power supply and the other contact is for the data input channel. The rotary contract may be installed coaxially with an axis of rotation of the image drum.

BRIEF DESCRIPTION OF THE DRAWINGS

For a better understanding of the present embodiments, reference may be had to the accompanying figures.

FIG. 2(*b*) illustrates a rotary electrical contact installed on a rotating drum accordingly to an embodiment of the invention.

FIG. 3(*b*) illustrates an embodiment of a nano digital direct printing system according to an embodiment;

FIG. 4(*b*) illustrates an array of thin film transistors in the apparatus for forming a latent image or direct printing according to an embodiment of the invention.

DETAILED DESCRIPTION

In the following description, it is understood that other embodiments may be utilized and structural and operational changes may be made without departure from the scope of the present embodiments disclosed herein.

In the present embodiment, systems and methods are described that utilize a rotary contact to communicate data between the stationary parts and the moving parts of the printing device. More specifically, the computer or print engine transmits the print file to the DFE (or controller). The DFE (or controller) converts the print file into digital color bits (either CMYK or RGB bits). The DFE (or controller) transmits the digital bits and operating voltages to the driving electronics in the imaging drum through the rotary electrical contact.

Figure 1:
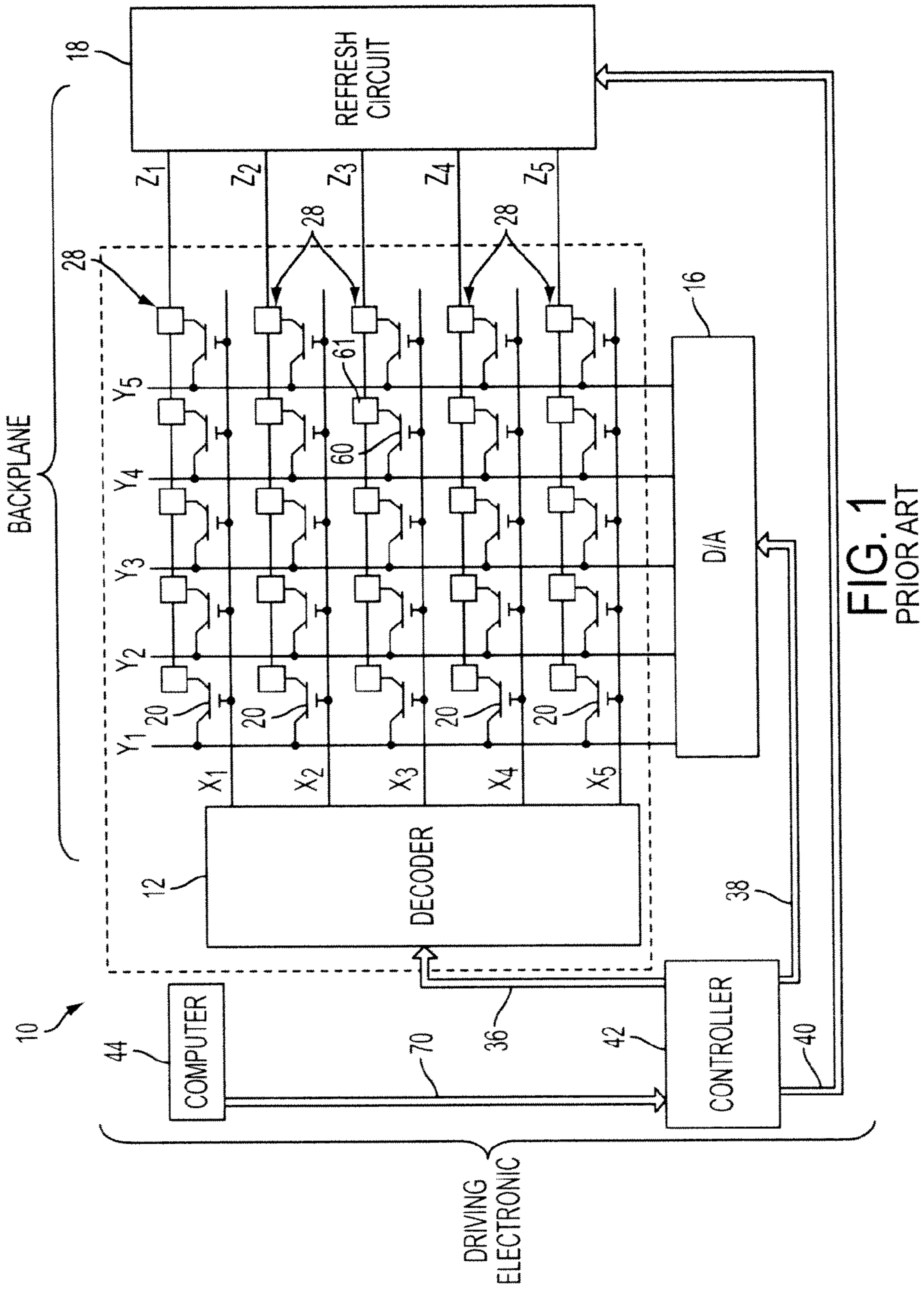
FIG. 1 PRIOR ART
FIG. 1 illustrates an array of thin film transistors in the apparatus for forming an imaging member according to the prior art.
Figure 2A:
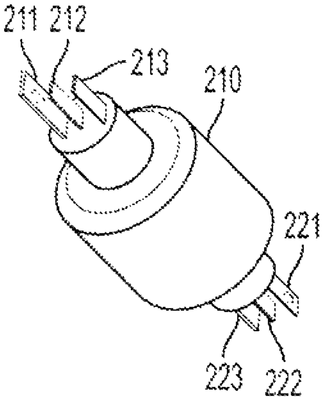
FIG. 2(*a*) illustrates a standalone rotary contact according to an embodiment of the invention.
Figure 2B:
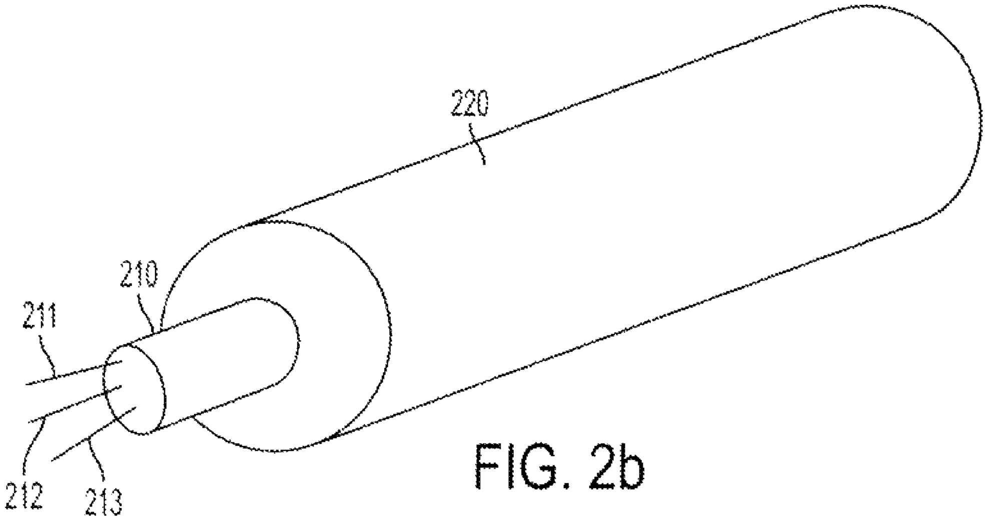

FIG. 2(*a*) illustrates a standalone rotary contact according to an embodiment of the invention. FIG. 2(*b*) illustrates a rotary electrical contact installed on a rotating drum accordingly to an embodiment of the invention. The rotary contact 210 illustrated in FIG. 2(*a*) includes three input terminals (contacts) 211 212 and 213 on both ends of the rotary contact 210. The rotary contact 210 may be, for example, Mercotact® Rotary Contact Model No. 331 or any other model (such as 331-SS, 430, 430-SS). The rotary electrical contact may be low noise with at least a 100 MHz signal transmission capability. The rotary electrical contact may have a voltage range of 0-250 Volts AC, a current rating of 4 amperes, a maximum RPM between 1200-1800 revolutions per minute, a typical rotational torque of 20-100 gm-cm, and a maximum operating frequency of 200 Megahertz.

As illustrated in FIG. 2(*b*), the rotary electrical contact 210 may be installed coaxially with the central axis of the rotating drum 220. The rotary electrical contact 210 may be installed on an end of the rotating image drum 220. Voltage signals (e.g., Vcc and ground) (power signals) are transferred from the controller to the rotary electrical contact 210 and to a power supply located inside the rotating drum. In FIGS. 2(*a*) and 2(*b*), three contacts (or terminals) 211 212 and 213 are illustrated (in FIG. 2(*a*) an additional three contacts (or terminals) 221 222 and 223 are shown. In the embodiment illustrated in FIGS. 2(*a*) and 2(*b*), one contact is for the serial transmission of the digital printing data and the other two contacts (terminal) are for transmission of voltage information, (e.g., Vcc and Ground signals).

The rotary electrical contact 210 transfers the digital data signals to driving electronics and the voltage signals to a power supply in the imaging drum 220. The driving electronics and the power supply may be located inside of the imaging drum. Illustratively, the power supply in the imaging drum 220 receives the voltage signals and then supplies a voltage signal and a ground signal (e.g., +5 Volts and 0 Volts (or ground) to the driving electronics to supply power for the driving electronics. In addition, the power supply transmits a high voltage as an operating voltage for the thin-film transistor (TFT) backplane. The digital data signals are converted by the driving electronics and select and drive selected TFTs in the TFT backplane. This creates a digital electric field within the nano imaging member. The digital electric field creates a latent image. Latent images are then printed (or developed) depending on the subsequent marking technology.

Figure 3A:
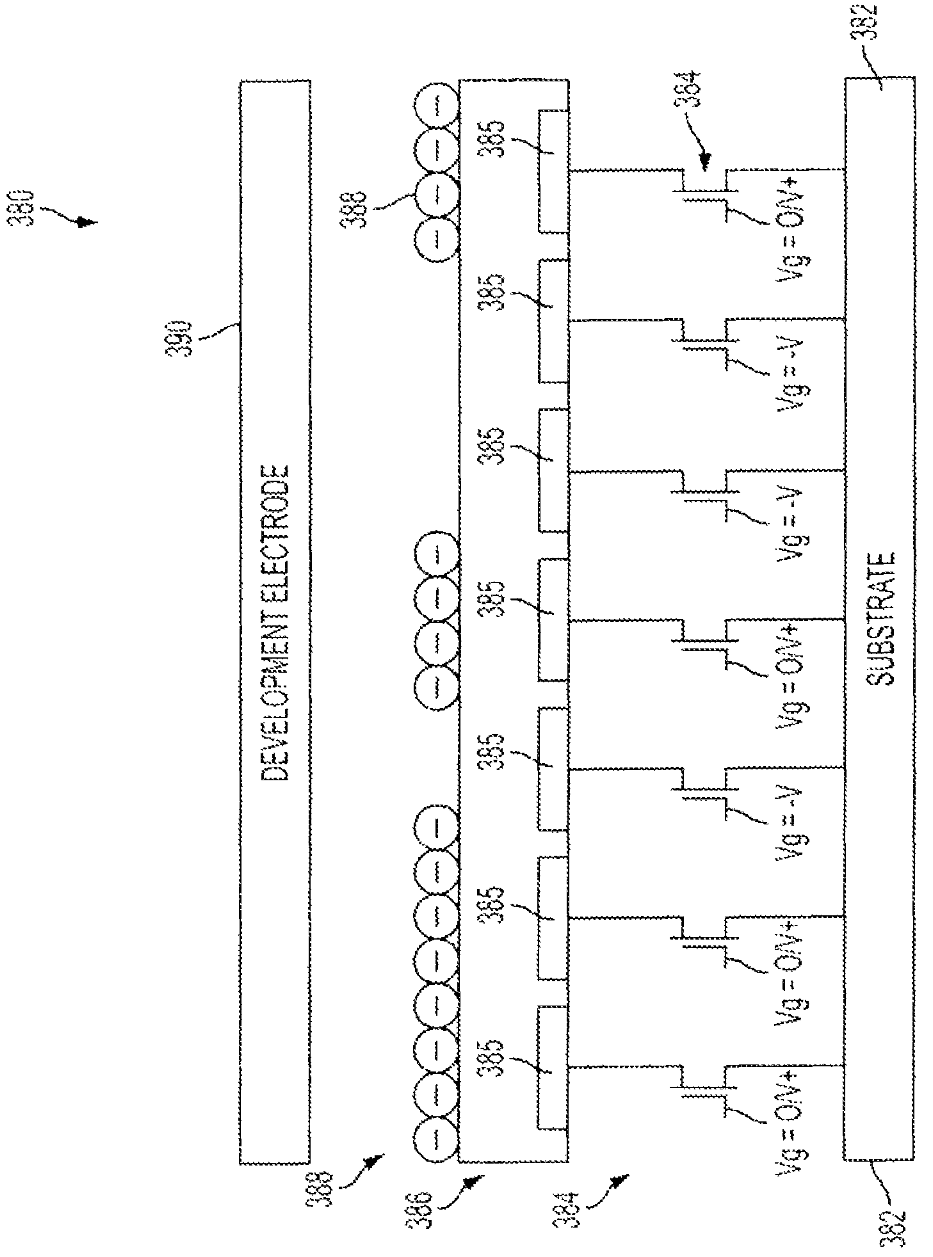
FIG. 3(*a*) illustrates operation of a latent imaging forming apparatus 380 using a nano imaging member.
Figure 3B:
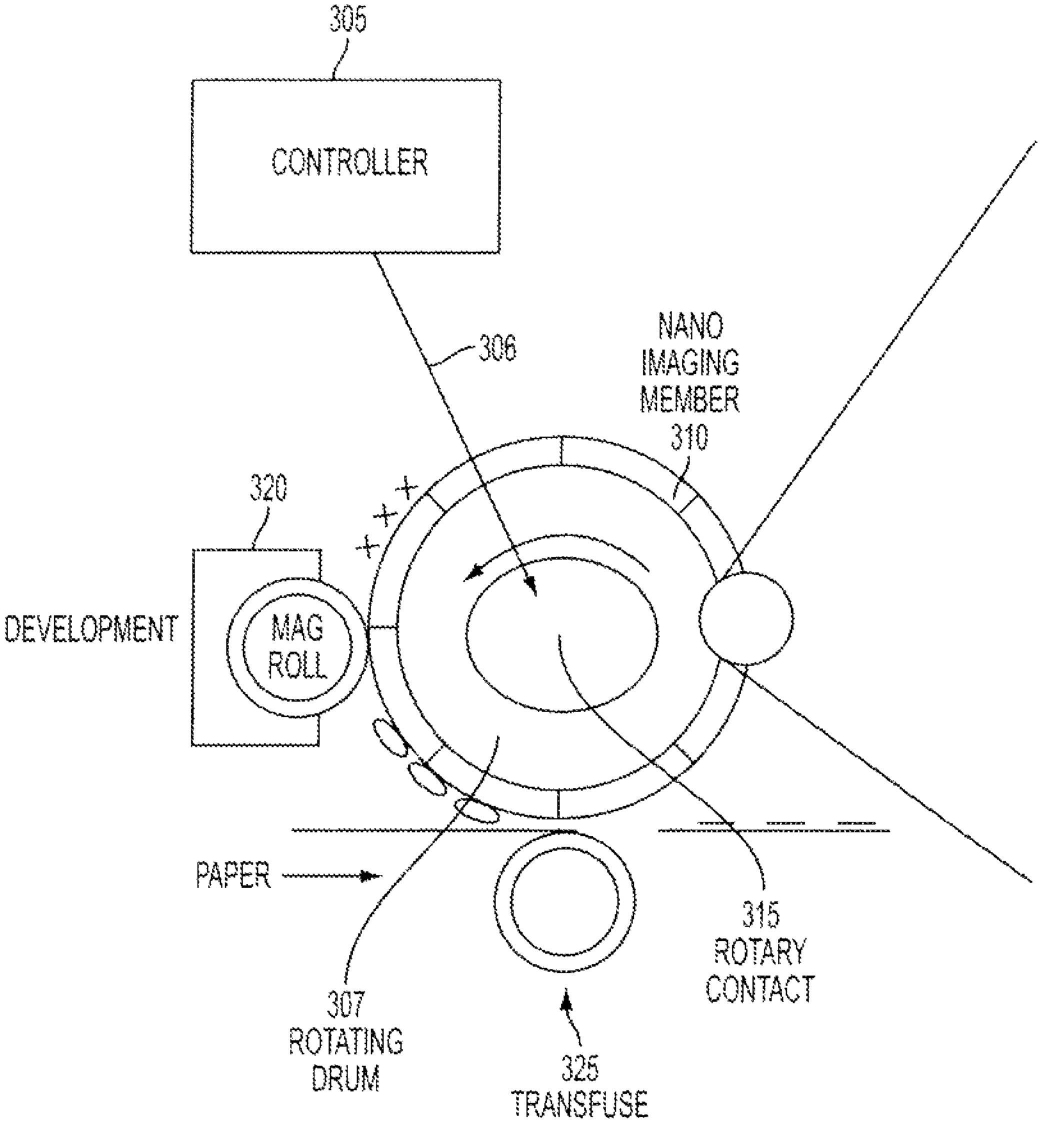

FIG. 3(*a*) illustrates operation of a latent imaging forming apparatus 380 using a nano imaging member. The latent imaging forming apparatus includes an array of hole injection pixels 385 over the substrate 382. The hole injection pixels are coupled to a TFT backplane comprising a plurality of TFTs 384 for addressing the individual pixels. The nano imaging member further includes a charge transport layer 386 disposed over the array of hole injecting pixels. The charge transport layer 386 can be configured to transport holes provided by the one or more pixels 385 to create electrostatic charge contrast required for printing.

In various embodiments, each pixel of the array 385 can include a layer of nano-carbon materials. In other embodiments, each pixel of the array 385 can include a layer of organic conjugated polymers. Yet in some other embodiments, each pixel of the array 385 can include a layer of a mixture of nano-carbon materials and organic conjugated polymers including, for example, nano-carbon materials dispersed in one or more organic conjugated polymers. In certain embodiments, the surface resistivity of the layer including the one or more of nano-carbon materials and/or organic conjugated polymers can be from about 50 ohm/sq to about 10,000 ohm/sq or from about 100 ohm/sq. to about 5,000 ohm/sq or from about 120 ohm/sq. to about 2,500 ohm/sq. The nano-carbon materials and the organic conjugated polymers can act as the hole-injection materials for the electrostatic generation of latent images. One of the advantages of using nano-carbon materials and the organic conjugated polymers as hole injection materials is that they can be patterned by various fabrication techniques, such as, for example, photolithography, inkjet printing, screen printing, transfer printing, and the like.

Hole-Injecting Pixels Including Nano-Carbon Materials

As used herein, the phrase "nano-carbon material" refers to a carbon-containing material having at least one dimension on the order of nanometers, for example, less than about 1000 nm. In embodiments, the nano-carbon material can include, for example, nanotubes including single-wall carbon nanotubes (SWNT), double-wall carbon nanotubes (DWNT), and multi-wall carbon nanotubes (MWNT); functionalized carbon nanotubes; and/or graphenes and functionalized graphenes, wherein graphene is a single planar sheet of $sp^2$-hybridized bonded carbon atoms that are densely packed in a honeycomb crystal lattice and is exactly one atom in thickness with each atom being a surface atom.

Carbon nanotubes, for example, as-synthesized carbon nanotubes after purification, can be a mixture of carbon nanotubes structurally with respect to number of walls, diameter, length, chirality, and/or defect rate. For example, chirality may dictate whether the carbon nanotube is metallic or semiconductive. Metallic carbon nanotubes can be about 33% metallic. Carbon nanotubes can have a diameter ranging from about 0.1 nm to about 100 nm, or from about 0.5 nm to about 50 nm, or from about 1.0 nm to about 10 nm; and can have a length ranging from about 10 nm to about 5 mm, or from about 200 nm to about 10 μm, or from about 500 nm to about 1000 nm. In certain embodiments, the concentration of carbon nanotubes in the layer including one or more nano-carbon materials can be from about 0.5 weight % to about 99 weight %, or from about 50 weight % to about 99 weight %, or from about 90 weight % to about 99 weight %. In embodiments, the carbon nanotubes can be mixed with a binder material to form the layer of one or more nano-carbon materials. The binder material can include any binder polymers as known to one of ordinary skill in the art.

In various embodiments, the layer of nano-carbon material(s) in each pixel of the pixel array 385 can include a solvent-containing coatable carbon nanotube layer. The solvent-containing coatable carbon nanotube layer can be coated from an aqueous dispersion or an alcohol dispersion of carbon nanotubes wherein the carbon nanotubes can be stabilized by a surfactant, a DNA or a polymeric material. In other embodiments, the layer of carbon nanotubes can include a carbon nanotube composite including, but not limited to, carbon nanotube polymer composite and/or carbon nanotube filled resin.

In embodiments, the layer of nano-carbon material(s) can be thin and have a thickness ranging from about 1 nm to about 1 μm, or from about 50 nm to about 500 nm, or from about 5 nm to about 100 nm.

Hole-Injecting Pixels Including Organic Conjugated Polymers

In various embodiments, the layer of organic conjugated polymers in each pixel of the pixel array can include any suitable material, for example, conjugated polymers based on ethylenedioxythiophene (EDOT) or based on its derivatives. The conjugated polymers can include, but are not limited to, poly(3,4-ethylenedioxythiophene) (PEDOT), alkyl substituted EDOT, phenyl substituted EDOT, dimethyl substituted polypropylenedioxythiophene, cyanobiphenyl substituted 3,4-ethylenedioxythiopene (EDOT), teradecyl substituted PEDOT, dibenzyl substituted PEDOT, an ionic group substituted PEDOT, such as, sulfonate substituted PEDOT, a dendron substituted PEDOT, such as, dendronized poly(para-phenylene), and the like, and mixtures thereof. In further embodiments, the organic conjugated polymer can be a complex including PEDOT and, for example, polystyrene sulfonic acid (PSS). The molecular structure of the PEDOT-PSS complex can be shown as the following:

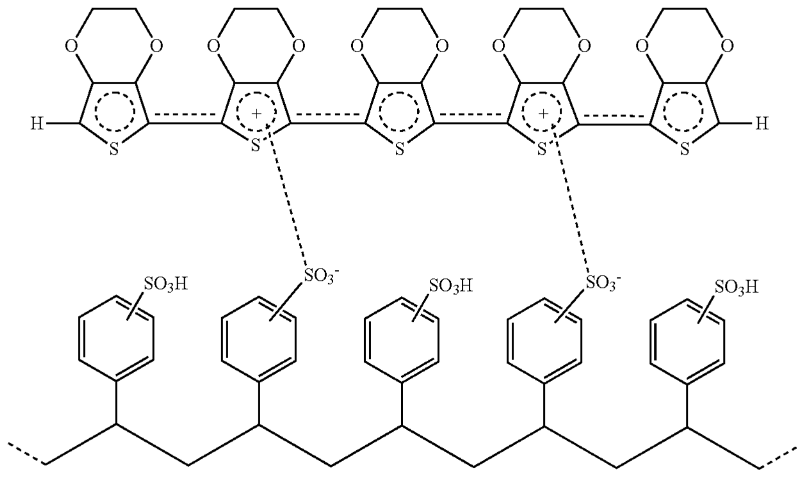

The exemplary PEDOT-PSS complex can be obtained through the polymerization of EDOT in the presence of the template polymer PSS. The conductivity of the layer containing the PEDOT-PSS complex can be controlled, e.g., enhanced, by adding compounds with two or more polar groups, such as for example, ethylene glycol, into an aqueous solution of PEDOT-PSS. As discussed in the thesis of Alexander M. Nardes, entitled "On the Conductivity of PEDOT-PSS Thin Films," 2007, Chapter 2, Eindhoven University of Technology, which is hereby incorporated by reference in its entirety, such an additive can induce conformational changes in the PEDOT chains of the PEDOT-PSS complex. The conductivity of PEDOT can also be adjusted during the oxidation step. Aqueous dispersions of PEDOT-PSS are commercially available as BAYTRON P® from H. C. Starck, Inc. (Boston, Mass.). PEDOT-PSS films coated on Mylar are commercially available in Orgacon™ films (Agfa-Gevaert Group, Mortsel, Belgium). PEDOT may also be obtained through chemical polymerization, for example, by using electrochemical oxidation of electron-rich EDOT-based monomers from aqueous or non-aqueous medium. Exemplary chemical polymerization of PEDOT can include those disclosed by Li Niu et al., entitled "Electrochemically Controlled Surface Morphology and Crystallinity in Poly(3,4-ethylenedioxythiophene) Films," Synthetic Metals, 2001, Vol. 122, 425-429; and by Mark Lefebvre et al., entitled "Chemical Synthesis, Characterization, and Electrochemical Studies of Poly(3,4-ethylenedioxythiophene)/Poly(styrene-4-sulfonate) Composites," Chemistry of Materials, 1999, Vol. 11, 262-268, which are hereby incorporated by reference in their entirety. As also discussed in the above references, the electrochemical synthesis of PEDOT can use a small amount of monomer, and a short polymerization time, and can yield electrode-supported and/or freestanding films.

In various embodiments, the array of pixels 385 can be formed by first forming a layer including nano-carbon materials and/or organic conjugated polymers over the substrate 382. Any suitable methods can be used to form this layer including, for example, dip coating, spray coating, spin coating, web coating, draw down coating, flow coating, and/or extrusion die coating. The layer including nano-carbon materials and/or organic conjugated polymers over the substrate 382 can then be patterned or otherwise treated to create an array of pixels 385. Suitable nano-fabrication techniques can be used to create the array of pixel 385 including, but not limited to, photolithographic etching, or direct patterning. For example, the materials can be directly patterned by nano-imprinting, inkjet printing and/or screen printing. As a result, each pixel of the array 385 can have at least one dimension, e.g., length or width, ranging from about 100 nm to about 500 μm, or from about 1 μm to about 250 μm, or from about 5 μm to about 150 μm.

Any suitable material can be used for the substrate 382 including, but not limited to, Aluminum, stainless steel, mylar, polyimide (PI), flexible stainless steel, poly(ethylene napthalate) (PEN), and flexible glass.

Charge Transport Layer

Referring back to FIG. 3*a*, the nano-enabled imaging member 380 can also include the charge transport layer 386 configured to transport holes provided by the one or more pixels from the pixels array 385 to the surface 388 on an opposite side to the array of pixels. The charge transport layer 386 can include materials capable of transporting either holes or electrons through the charge transport layer 386 to selectively dissipate a surface charge. In certain embodiments, the charge transport layer 386 can include a charge-transporting small molecule dissolved or molecularly dispersed in an electrically inert polymer. In one embodiment, the charge-transporting small molecule can be dissolved in the electrically inert polymer to form a homogeneous phase with the polymer. In another embodiment, the charge-transporting small molecule can be molecularly dispersed in the polymer at a molecular scale. Any suitable charge transporting or electrically active small molecule can be employed in the charge transport layer 386. In embodiments, the charge transporting small molecule can include a monomer that allows free holes generated at the interface of the charge transport layer and the pixel to be transported across the charge transport layer 386 and to the surface 388. Exemplary charge-transporting small molecules can include, but are not limited to, pyrazolines such as, for example, 1-phenyl-3-(4'-diethylamino styryl)-5-(4"-diethylamino phenyl)pyrazoline; diamines such as, for example, N,N'-diphenyl-N,N'-bis(3-methylphenyl)-(1,1'-biphenyl)-4,4'-diamine (TPD); other arylamines like triphenyl amine, N,N,N,N'-tetra-p-tolyl-1,1'-biphenyl-4,4'-diamine (TM-TPD); hydrazones such as, for example, N-phenyl-N-methyl-3-(9-ethyl)carbazyl hydrazone and 4-diethyl amino benzaldehyde-1,2-diphenyl hydrazone; oxadiazoles such as, for example, 2,5-bis(4-N,N'-diethylaminophenyl)-1,2,4-oxadiazole; stilbenes; aryl amines; and the like. Exemplary aryl amines can have the following formulas/structures:

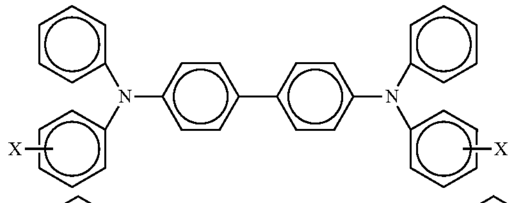

and

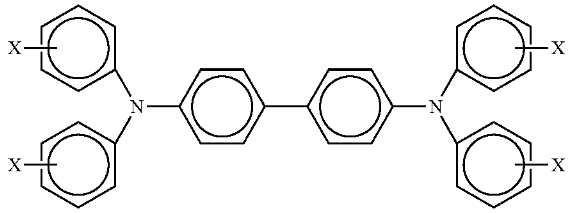

wherein X is a suitable hydrocarbon like alkyl, alkoxy, aryl, and derivatives thereof; a halogen, or mixtures thereof, and especially those substituents selected from the group consisting of Cl and $CH_3$; and molecules of the following formulas

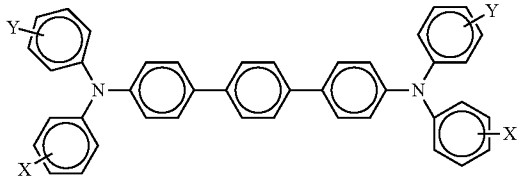

and

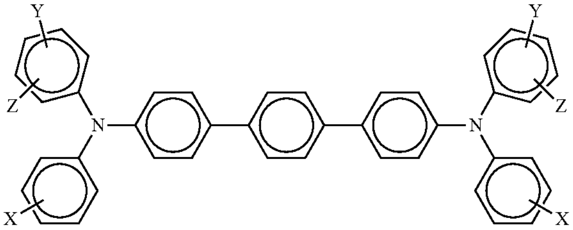

wherein X, Y and Z are independently alkyl, alkoxy, aryl, a halogen, or mixtures thereof, and wherein at least one of Y and Z is present.

Alkyl and/or alkoxy groups can include, for example, from 1 to about 25 carbon atoms, or from 1 to about 18 carbon atoms, or from 1 to about 12 carbon atoms, such as methyl, ethyl, propyl, butyl, pentyl, and/or their corresponding alkoxides. Aryl group can include, e.g., from about 6 to about 36 carbon atoms of such as phenyl, and the like. Halogen can include chloride, bromide, iodide, and/or fluoride. Substituted alkyls, alkoxys, and aryls can also be used in accordance with various embodiments.

Examples of specific aryl amines that can be used for the charge transport layer 240 can include, but are not limited to, N,N'-diphenyl-N,N'-bis(alkylphenyl)-1,1'-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[-p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4"-diamine, and the like. Any other known charge transport layer molecules can be selected such as, those disclosed in U.S. Pat. Nos. 4,921,773 and 4,464,450, the disclosures of which are incorporated herein by reference in their entirety.

As indicated above, suitable electrically active small molecule charge transporting molecules or compounds can be dissolved or molecularly dispersed in electrically inactive polymeric film forming materials. If desired, the charge transport material in the charge transport layer 386 can include a polymeric charge transport material or a combination of a small molecule charge transport material and a polymeric charge transport material. Any suitable polymeric charge transport material can be used, including, but not limited to, poly(N-vinylcarbazole); poly(vinylpyrene); poly(-vinyltetraphene); poly(vinyltetracene) and/or poly(vinylperylene).

Any suitable electrically inert polymer can be employed in the charge transport layer 386. Typical electrically inert polymer can include polycarbonates, polyarylates, polystyrenes, acrylate polymers, vinyl polymers, cellulose polymers, polyesters, polysiloxanes, polyamides, polyurethanes, poly(cyclo olefins), polysulfones, and epoxies, and random or alternating copolymers thereof. However, any other suitable polymer can also be utilized in the charge transporting layer 386 such as those listed in U.S. Pat. No. 3,121,006, the disclosure of which is incorporated herein by reference in its entirety.

In various embodiments, the charge transport layer 386 can include optional one or more materials to improve lateral charge migration (LCM) resistance including, but not limited to, hindered phenolic antioxidants, such as, for example, tetrakis methylene(3,5-di-tert-butyl-4-hydroxy hydrocinnamate) methane (IRGANOX® 1010, available from Ciba Specialty Chemical, Tarrytown, N.Y.), butylated hydroxytoluene (BHT), and other hindered phenolic antioxidants including SUMILIZER™ BHT-R, MDP-S, BBM-S, WX-R, NR, BP-76, BP-101, GA-80, GM, and GS (available from Sumitomo Chemical America, Inc., New York, N.Y.), IRGANOX® 1035, 1076, 1098, 1135, 1141, 1222, 1330, 1425WL, 1520L, 245, 259, 3114, 3790, 5057, and 565 (available from Ciba Specialties Chemicals, Tarrytown, N.Y.), and ADEKA STAB™ AO-20, AO-30, AO-40, AO-50, AO-60, AO-70, AO-80, and AO-330 (available from Asahi Denka Co., Ltd.); hindered amine antioxidants such as SANOL™ LS-2626, LS-765, LS-770, and LS-744 (available from SANKYO CO., Ltd.), TINUVIN® 144 and 622LD (available from Ciba Specialties Chemicals, Tarrytown, N.Y.), MARK™ LA57, LA67, LA62, LA68, and LA63 (available from Amfine Chemical Corporation, Upper Saddle River, N.J.), and SUMILIZER® TPS (available from Sumitomo Chemical America, Inc., New York, N.Y.); thioether antioxidants such as SUMILIZER® TP-D (available from Sumitomo Chemical America, Inc., New York, N.Y.); phosphite antioxidants such as MARK™ 2112, PEP-8, PEP-24G, PEP-36, 329K, and HP-10 (available from Amfine Chemical Corporation, Upper Saddle River, N.J.); other molecules such as bis(4-diethylamino-2-methylphenyl)phenylmethane (BDETPM), bis-[2-methyl-4-(N-2-hydroxyethyl-N-ethyl-aminophenyl)]-phenylmethane (DHTPM), and the like. The charge transport layer 240 can have antioxidant in an amount ranging from about 0 to about 20 weight %, from about 1 to about 10 weight %, or from about 3 to about 8 weight % based on the total charge transport layer.

The charge transport layer 386 including charge-transporting molecules or compounds dispersed in an electrically inert polymer can be an insulator to the extent, that the electrostatic charge placed on the charge transport layer 386 is not conducted such that formation and retention of an electrostatic latent image thereon can be prevented. On the other hand, the charge transport layer 386 can be electrically "active" in that it allows the injection of holes from the layer including one or more of nano-carbon materials and organic conjugated polymers in each pixel of the array of hole-injecting pixels 385, and allows these holes to be transported through the charge transport layer 386 itself to enable selective discharge of a negative surface charge on the surface 388.

Any suitable and conventional techniques can be utilized to form and thereafter apply the charge transport layer 386 over the array of pixels 385. For example, the charge transport layer 386 can be formed in a single coating step or in multiple coating steps. These application techniques can include spraying, dip coating, roll coating, wire wound rod coating, ink jet coating, ring coating, gravure, drum coating, and the like.

Drying of the deposited coating can be effected by any suitable conventional technique such as oven drying, infra red radiation drying, air drying and the like. The charge transport layer 386 after drying can have a thickness in the range of about 1 μm to about 50 μm, about 5 μm to about 45 μm, or about 15 μm to about 40 μm, but can also have thickness outside this range.

Amorphous Silicon for fabrication of Transistor arrays in the backplane:

Amorphous Silicon can be chosen as the semiconductor material for the fabrication of the transistors. Amorphous Si TFT is used widely as the pixel addressing elements in the display industry for its low cost processing and matured fabrication technology. Amorphous Si TFTs are also suitable for high voltage operations by modifying the transistor geometry (ref: K. S. Karim et al. Microelectronics Journal 35 (2004), 311., H. C. Tuan, Mat. Res. Symp. Proc. 70 (1986).

A latent image forming system 380 using a TFT backplane includes a plurality of TFTs with the source electrodes connected to the substrate 382 and drive the hole injection pixels coupled to a charge transport layer 386 (i.e., a hole transport layer). The system 380 uses TFT control for both electronic discharge for surface potential reduction and for latent image formation. A development (printing) electrode can be used to charge or just create an electric field across the charge transport layer 386. The development electrode can be a biased toned mag brush, a biased ink roll, a corotron, scorotron, discorotron, biased charge roll, bias transfer roll and like. For example, direct printing can obtained by bringing the nano imaging member in a nip forming configuration with a bias toned mag roll. The mag roll can be negatively bias with a voltage of −V. Printing can result is the TFT is grounded (V=0) or slightly positive. Under this configuration, an electric is created between the printing electrode and the hole injection pixel 385. The field induced hole injection and create a positive surface charge on surface 388. The positive charge is then developed resulting in printing. On the other hand, when the TFT is biased like the mag roll (−V), no electric field is created. Consequently no surface charge is created in surface 388 and no printing is resulted.

FIG. 3(*b*) illustrates an embodiment of a nano digital direct printing system according to the invention. The nano digital direct printing system includes a controller 305, a nano imaging member 310, a rotary contact 315, a development subsystem 320 and a transfer/fuser subsystem 325. The controller 305 transmits digital printing data to the rotary contact 315, as illustrated by reference number 306, which is installed on a rotating drum 307. In an embodiment of the invention, the rotary contact 315 may be installed on an end of the rotating drum 307. The digital printing data and operating voltages are transmitted to the driving electronics/demultiplexer and the power supply located inside of the rotating drum 307.

The nano imaging member 310 receives printing signals from the driving electronics/demultiplexer and a high voltage signal from the power supply. The nano imaging member 310 and converts the printing signals into an electrostatic latent image. More specifically, the rotary contact 315 transmits energy (or voltage signals) and digital data signals to driving electronics in the nano imaging member. The driving electronics receives the data signals and converts the digital data signals to analog signals. The analog signals control the driving electronics and the driving electronics drive the multitude of TFTs in the backplane of the nano imaging member 310. The TFTs in turn will address the hole injection pixels of the imaging member individually thus creating a digital electric field across the nano imaging member 310 when contacting the development subsystem 320. The electrostatic latent image can be formed during the contact and be developed or printed. Suitable printing materials are dry powder xerographic toner, liquid toner, flexo inks, offset inks or other low viscosity inks. The transfer / fuser subsystem 325 receives the image and transfers the image onto a media. The image can then be fixed on the media by heat, pressure and/or UV radiation depending on the imaging material used.

Figure 4A:
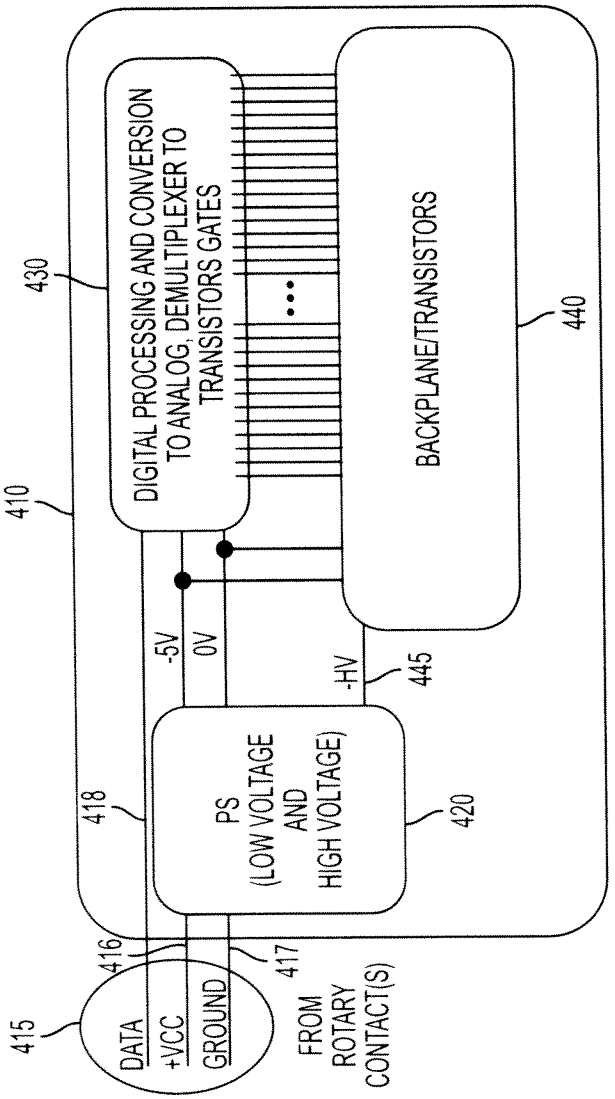
FIG. 4(*a*) illustrates a block diagram of a rotary contact coupled to a rotating image drum according to embodiments of the invention.
Figure 4B:
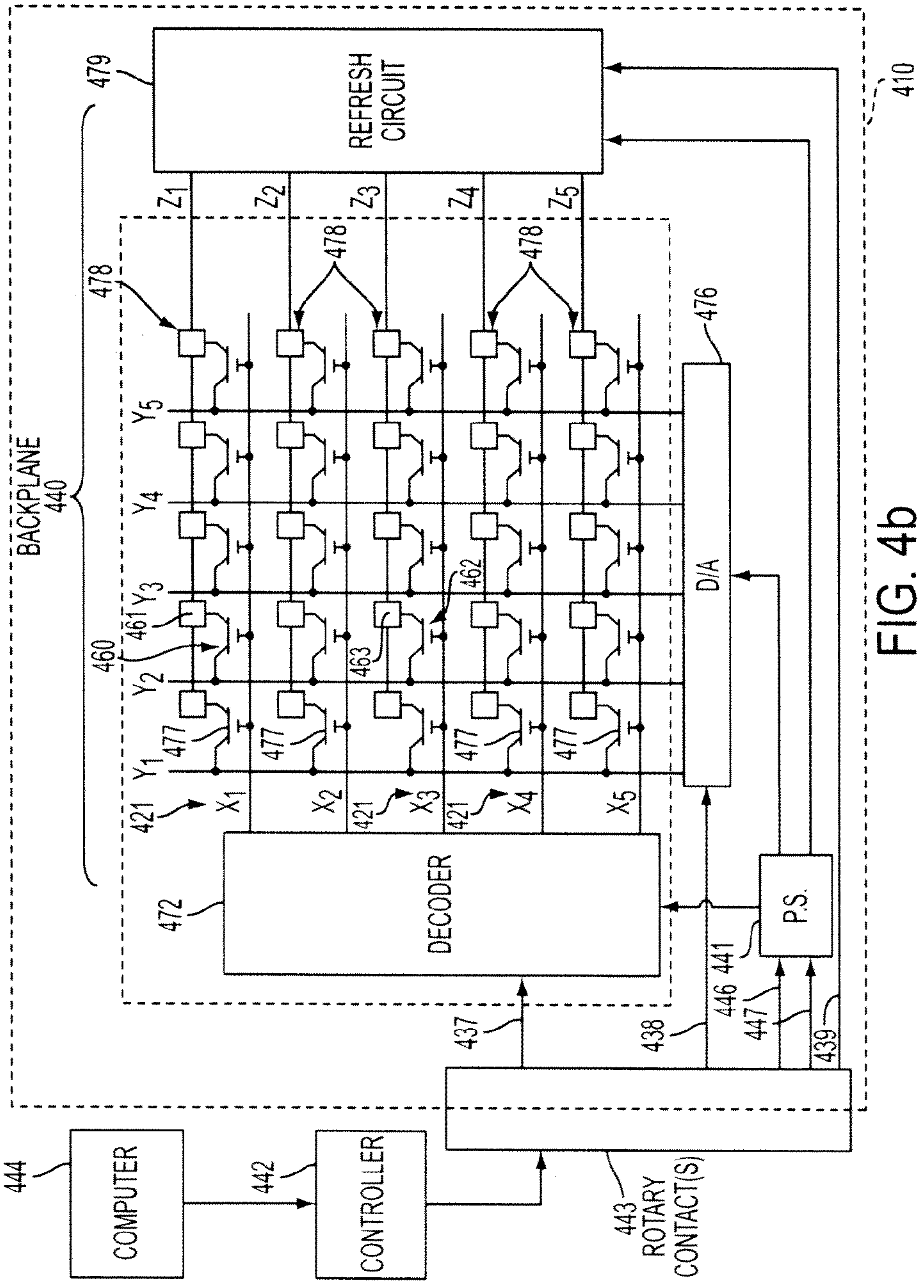

FIG. 4(*a*) illustrates a block diagram of a rotary contact coupled to a rotating image drum according to embodiments of the invention. The rotary contact 415 is coupled or connected to the rotating drum 410. A power supply 420 and driving electronics 430 are located on the inside of the rotating drum 410. The driving electronics 430 are coupled to a backplane of thin-film transistors (TFT) 440. In embodiments of the invention, the backplane of TFTs 440 is formed in a two-dimensional array. The backplane of TFTs 440 may be part of a nano imaging member.

In the embodiment of the invention illustrated in FIG. 4(*a*), two lines 416 and 417 from the rotary contact 415 supply voltage levels to the rotating drum. In this embodiment, one line 418 supplies digital data to the driving electronics/demultiplexer 430. This is the minimum number of wires/terminals that may be supplied to the image drum 410 (e.g., the power supply 420 and the driving electronics/demultiplexer 430). The digital data is transmitted serially. Any serial data transmission well known to those skilled in the art may be utilized.

In alternative embodiments of the invention, three lines may supply voltage levels to the rotating drum and two or more lines may supply data to the driving electronics/demultiplexer 430. The power supply 420 generates operating voltages for the driving electronics/demultiplexer 430 and the backplane of TFTs 440. For example, the operating voltages for the driving electronics/demultiplexer may be 0 volts and +5 Volts. In addition, the power supply generates a high voltage (HV) that is supplied/applied to the backplane of TFTs 440. The digital data received by the driving electronics is converted to an analog format by the digital to analog converter in the driving electronics/demultiplexer 430. A demultiplexer in the driving electronics/demultiplexer 430 addresses the converted data signals to leads or connections that are part of the backplane of TFTs. The leads or connections are coupled to the individual addressable pictures.

FIG. 4(*b*) illustrates an array of thin film transistors in the apparatus for forming a latent image or direct printing according to an embodiment of the invention. As shown, FIG. 4 illustrates a TFT array 440, which is part of a backplane, which is arranged in a rectangular matrix of 5 rows and 5 columns. The TFT array 440 generates latent images from digital information supplied by a computer 444 to a controller 442. In an embodiment of the invention, the computer 444 transmits the digital print file to the controller or digital front end (DFE) 442.

The controller 442 will decompose the digital signal into CMYK or RGB digital bits and will serially transmit the digital bits to the driving electronics/demultiplexer 440. The controller 442 may be coupled to a serial transmission device. The data may be transmitted via any digital channel, including and not limited to a serial USB cable or other serial printer cable.

The controller 442 transfers the serial data to the rotary contact 443 and then to the rotating imaging drum 410. The controller also transmits operating voltage levels through the rotary contact 443 to a power supply 441 in the rotating imaging drum. In embodiments of the invention, the Vcc provided through the rotary contact 443 is high voltage. Illustratively, the Vcc may be 100 Volts to 400 Volts. In other embodiments of the invention, the Vcc may be 10 Volts to 200 Volts. The power supply receives, for example, Vcc and a ground signal, via the rotary contact 443 on lines 446 and 447. In embodiments of the invention, the power supply 441 generates a +5 Volt signal and a 0 volt signal. The power supply 441 also generates a high voltage signal 445. The high voltage signal 445 is provided to the backplane of TFT transistors 410.

The digital serial information includes pixel locations and pixel voltages. In embodiments of the invention, the controller 442 controls/directs the operation of the TFT array 440 through the rotary contact 443 by transmitting the digital information through a rotary contact 443 and to a plurality of interface devices, including the decoder 472, a refresh circuit 479, and a digital-to-analog (D/A) converter 476. The decoder 472, refresh circuit 479 and D/A converter 476 may be referred to as the driving electronics 430.

After receiving the digital signals from the rotary contact 443, the decoder 472 generates signals that select individual pixel cells in array 440 by their row and column locations to produce a latent image. Illustratively, the controller 442 transmits digital serial data to the rotary contact 443 and the rotary contact transfers the information to the decoder 472 via bus 437. In this embodiment, the controller 442 generates digitized pixel voltage and location information and transmits the digitized pixel voltages through the rotary contact 443 to analog (D/A) converter 476 via bus 438. The D/A converter 476 converts the digitized pixel voltages to analog voltages which are placed on the selected column or columns Y1-Y5. In order to refresh the nano imaging member, the controller 442 transmits address data serially through the rotary contact 443 and then to the refresh circuit 479 via bus 439 to select rows Z1-Z5. The refresh circuit 479 operates in a fashion similar to memory refresh circuits used to recharge capacitors in dynamic random access memories (DRAMs).

In embodiments of the invention, the operating bias voltage for the TFT backplane 440 may range from +20 Volts to −200

Volts. In alternative embodiments of the invention, the operating bias voltage for the TFT backplane 440 may range from +100 to −400 Volts. In embodiments of the invention, the pixel size may range from 10 micron×10 micron to 30 micron by 30 micron. In other embodiments of the invention, pixel size may range from 1 micron×1 micron to 200 micron by 200 micron. The connection of the operating bias voltage to the TFT backplane is not illustrated in FIG. 4(*b*).

In the embodiment illustrated in FIG. 4(*b*), each pixel pad 478 is connected to a thin film transistor 477 and includes a capacitor in contact with a hole injection pixel Semiconductor materials, such as amorphous silicon (a-Si:H), are well suited to the desired operational and fabrication characteristics of the transistors. In view of the relatively inexpensive fabrication costs of both active and passive thin film devices over large area formats (for example, upon Aluminum, stainless steel, glass, polyimide, or other suitable substrates), it is possible to provide a cost effective TFT array 440. Furthermore, the TFT backplane 440 may incorporate high voltage thin film transistors on the same integrated circuit as the high voltage capacitors and decoder 472.

Operation of illustrated portions of the array 410 is as follows. The print engine 444 supplies digital image information to the TFT array 410 via the driving electronics. Still referring to FIG. 4, the print engine first convert the digital print into CMYK or RGB color bits through the digital front end or the controller 442. The Controller 442 transmits information serially, through a rotary contact 443, to the decoder 372, which is part of the driving electronic. The digital signal will have information about the pixels location and bias voltage, e.g., at the intersection of 1) row $X_3$ and column $Y_4$; 2) row $X_4$ and column $Y_2$; and 3) row $X_1$ and column $Y_3$ should be charged to form a portion of an image. Illustratively, the print engine 444 transmits a code of binary digits from to select the rows to charge the pixels $X_3Y_4$, $X_4Y_2$, and $X_1Y_3$. The code of binary digits passes through the controller 442 and the rotary contact 443 to the decoder 472 via bus line 437. In the embodiment of FIG. 4(*b*), the decoder 472 receives the transmitted code of binary digits and applies a gate bias voltage to the transistors 421 on rows $X_3$, $X_4$ and $X_1$. The print engine computer 444 transmits the digitized pixel voltages to the controller 442. The controller 442 transmits the digitized pixel voltages through the rotary contract 443 to the D/A converter 476 via bus line 438. The D/A converter 476 produces an analog output corresponding to the value of the digital input and places it on the source electrodes of the high voltage transistors connected to columns $Y_4$, $Y_2$ and $Y_3$. As shown in FIG. 4, only three of the transistors, generally indicated by the reference numerals 460, 462, and 464 are turned ON by the combination of the $X_3$ gate bias voltage and the voltage on column $Y_4$; the combination of the $X_4$ gate bias voltage and the voltage on column $Y_2$, and the combination of the $X_1$ gate bias voltage and the voltage on column $Y_3$. Therefore, the analog voltage only appears at the drain of transistor 460, 462 and 464 and charges the high voltage capacitor contained in the pixel pad indicated by reference numeral 461, 463 and 465. This process is repeated for each subsequent pixel that is addressed until the desired latent image is produced. Over time the capacitors will begin to discharge. To preserve their charge, each pixel cell must be refreshed by the refresh circuit 479, which receives signals from the rotary contact 443 via bus line 439.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A method of forming an electrostatic latent image, comprising:

receiving, via a rotary electrical contact, serially transmitted digital printing signals from a controller;

receiving, via the rotary electrical contact, operating voltages;

converting, at a power supply that is coupled to the rotary electrical contact and that is located inside of a rotating imaging drum, the operating voltages into a voltage signal and a high voltage signal;

transferring driving signals to address multitude of thin-film transistors (TFTs) individually in a TFT backplane in response to the received digital printing signals along with transferring the high voltage signal to the TFT backplane;

transferring pixel voltages to bias individual TFTs in the TFT backplane to generate the electrostatic latent image in response to the received digital printing signals; and supplying, from the power supply, the voltage signal and a ground signal to driving electronics.

2. The method of claim 1, further including converting the electrostatic image into an image that is printed on a media.

3. The method of claim 1, wherein creating the electrostatic latent image further comprises applying an electrical bias to one or more pixels via the individual TFTs in the TFT backplane to either enable hole injection or disable hole injection at the interface of the one or more pixels and the charge transport layer.

4. The method of claim 1 further including receiving the electrostatic latent image at the development subsystem and converting the electrostatic latent image into a toned image.

5. The method of claim 4, further including receiving the toned image, transferring the toned image onto a media, and fixing the toned image onto the media.

6. The method of claim 4, the toned image include images made from dry powder toner, liquid toner, offset inks, flexo inks and other low viscosity inks.

7. The method of claim 1, wherein the digital data signals are transmitted via one terminal on the rotary contact.

8. The method of claim 1, wherein the digital data signals are transmitted via two terminals of the rotary contact.

9. An apparatus for printing a latent image comprising:

a rotary contact configured to receive serially transmitted digital data signals from a controller and to generate selection signals and digital pixel voltages, the rotary contact configured to receive operating voltage signals from the controller;

a power supply, coupled to the rotary contact, and located inside of a rotating image drum, to receive the operating voltage signals on two lines from the rotary contact and to generate a low voltage signal, a ground signal and a high voltage signal;

driving electronics, coupled to the power supply and resident interior to the rotating image drum, and configured to receive the low voltage signal, the ground signal, selection signals and the digital pixel voltages, and to generate bias signals and pixel voltages; and a plurality of thin-film transistors (TFTs) arranged in a TFT backplane configured to receive the high voltage signal and to receive the bias signals and the pixel voltages and to drive the hole injection pixels to generate an electrostatic latent image in response to the bias signals and pixel voltages.

10. The apparatus of claim 9, wherein the rotary contact is installed on one end of a rotating image drum and the TFT backplane is located on an outer surface of the rotating image drum.

11. The apparatus of claim 9, wherein the TFT backplane is comprised of an array of pixels disposed over a substrate and a charge transport layer disposed over the array of pixels, wherein each pixel of the array of pixels is electrically isolated, individually addressable and comprises a layer of one or more nano-carbon materials or organic conjugated polymers.

12. The apparatus of claim 9, wherein two terminals of the rotary contact receive the operating voltages and two terminals of the rotary contact receive the serially transmitted digital data signals from the controller.

13. The apparatus of claim 9, further including a second rotary contact configured to receive serially transmitted digital data signals from a print engine and to generate selection signals and digital pixel voltages, the second rotary contact also configured to receive operating voltage signals from the print engine.

14. The apparatus of claim 9, wherein the TFT backplane is configured to be connected to a rotating drum or belt and further including a printing station configured to convert the electrostatic latent image to a toned image.

15. The apparatus according to claim 14, further including a transfuse system configured to receive the toned image, transfer and fuse the toned image onto a media.

16. The apparatus of claim 14 wherein the toned image include images made from dry powder toner, liquid toner, offset inks, flexo inks and other low viscosity inks.

17. The apparatus of claim 9, wherein the rotary contact is installed coaxially with the axis of rotation of the image drum.

18. A printing device, comprising:

a controller configured to receive a digital image file from a computer and to generate digital signals corresponding to the received digital image file;

a rotary contact configured to receive the generated digital signals and voltage signals;

driving electronics to receive the transferred digital signals from the rotary contact, wherein the transferred digital signals include control signals and pixel voltages which bias individual thin field transistors (TFTs) in a backplane to generate a latent electrostatic image; and a power supply, located inside of a rotating image drum and coupled to the rotary contract and the driving electronics, to receive the voltage signals and generate a first voltage signal and a ground signal that is supplied to the driving electronics and to generate a high voltage signal to drive the backplane of TFTs.

19. The printing device according to claim 18, wherein the backplane is comprised of an array of pixels disposed over a substrate and a charge transport layer disposed over the array of pixels, wherein each pixel of the array of pixels is electrically isolated, individually addressable and comprises a layer of one or more nano-carbon materials or organic conjugated polymers.

20. The printing device according to claim 18, further including a decoder configured to receive the control signals from the rotary contact and to apply bias voltages to selected rows of the TFT array based on the received control signals.

21. The printing device according to claim 20, further including a digital-to-analog converter configured to receive the pixel voltages, generate analog voltages and apply the analog voltages to selected TFTs within the backplane.

22. The printing device according to claim 18, the backplane connected to a rotating drum or belt and further including a printing station configured to print the electrostatic latent image depending on the imaging material whether it is a dry toner, liquid toner, flexo ink or offset ink, transfer and fuse the image onto a media.

23. The printing device of claim 18, wherein two terminals of the rotary contact receive the operating voltages and one terminal of the rotary contact receives the generated digital data signals from the controller.

24. The printing device of claim 18, wherein the rotary contact is installed on one end of a rotating image drum and the TFT backplane is located on an outer surface of the rotating image drum.

* * * * *